May 28, 1963　　　　　　　D. BRAND　　　　　　3,091,038
LINE SPOOLING AND MEASURING APPARATUS
Filed Dec. 4, 1961　　　　　　　　　　　　2 Sheets-Sheet 1
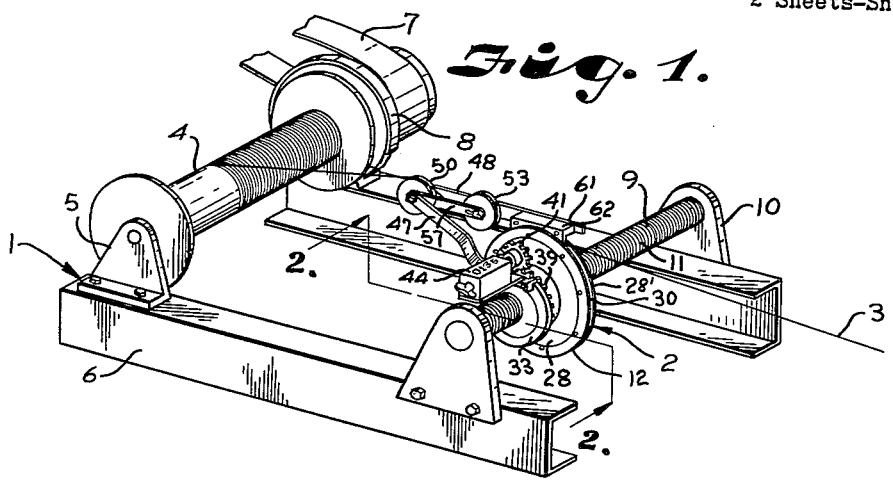
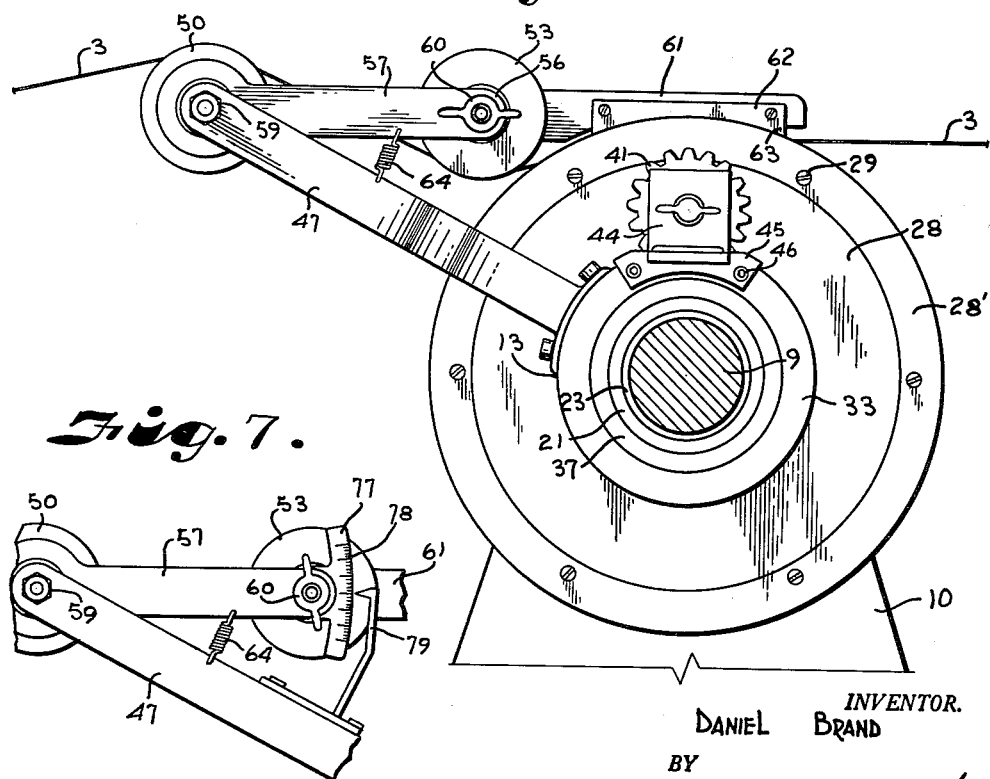
INVENTOR.
DANIEL BRAND
BY
Fishburn and Gold
ATTORNEYS May 28, 1963
D. BRAND
3,091,038
LINE SPOOLING AND MEASURING APPARATUS
Filed Dec. 4, 1961
2 Sheets-Sheet 2
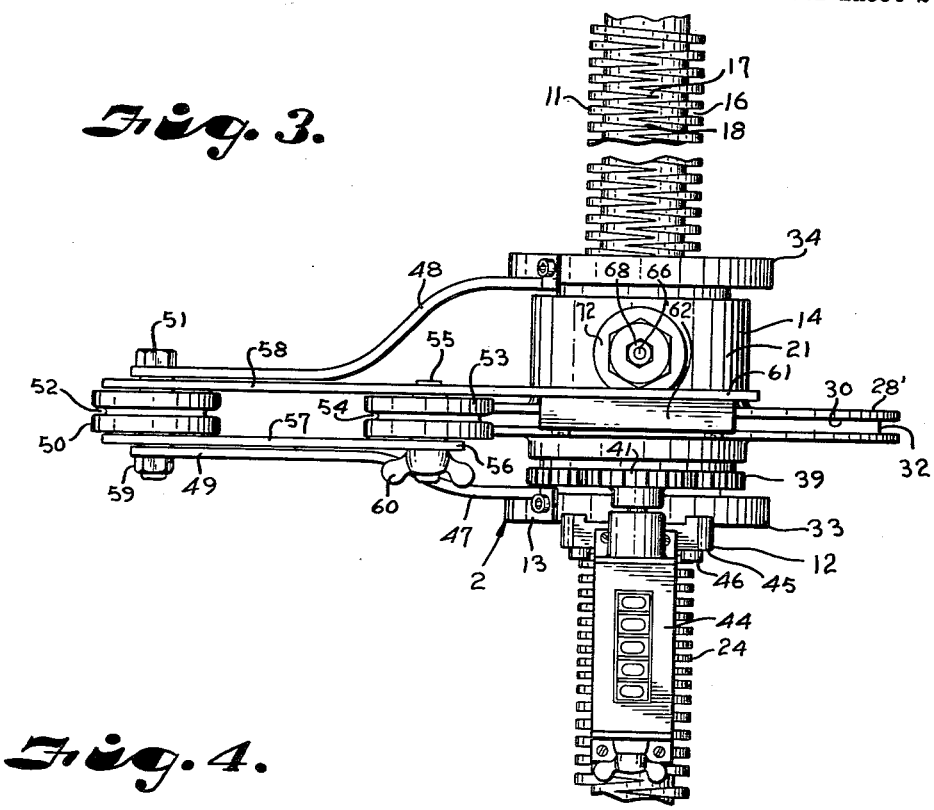
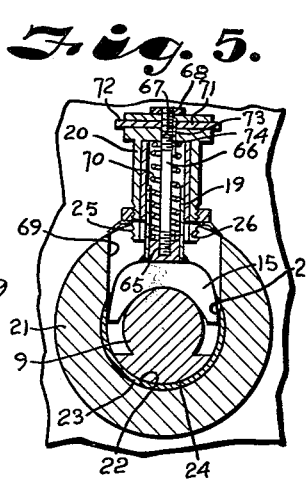
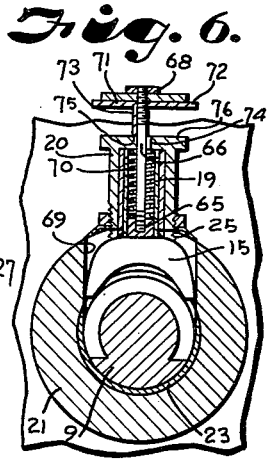
INVENTOR.
DANIEL BRAND
BY
Fishburn and Gold
ATTORNEYS 3,091,038
LINE SPOOLING AND MEASURING APPARATUS
Daniel Brand, 4349 S. Rockford Place, Tulsa 5, Okla.
Filed Dec. 4, 1961, Ser. No. 156,895
9 Claims. (Cl. 33—129)

This invention relates to apparatus for paying out and winding in line, and more particularly to apparatus for measuring the length of line payed therethrough and effecting a level wind of the line, as for example, in determining the depth or locations in a well or other bore hole.

The principal objects of the present invention are to provide a reeling and braking mechanism wherein a line is on a drum and payed out through a measure meter apparatus mounted for bodily movement on a line parallel to the axis of the drum and spaced therefrom whereby the measure meter apparatus is moved to and fro and the line between the drum and the measure meter is substantially in a plane normal to the axis of the drum and measures the length of line payed therethrough; to provide such an apparatus wherein the line extends around a driving wheel to rotate the wheel in response to paying out or winding in the line, and the movement of the measure meter to effect a level wind or spooling of the line on the drum is in response to rotation of said driving wheel; to provide such a structure wherein a brake element engages the line on the wheel to hold same in position when tension on the line is relaxed with the brake being released in response to tension on the line; to provide such a structure with indicating devices to indicate the tension on the line; to provide a measure meter apparatus with guides and a brake to retain the line substantially in a plane and engaged with the driving wheel at all times; and to provide a measure meter apparatus and level wind apparatus that will operate accurately and that is economical to manufacture and efficient in use.

Other objects and advantages of this invention will become apparent from the following description taken in connection with the accompanying drawings wherein are set forth by way of illustration and example certain embodiments of this invention.

FIG. 1 is a perspective view of a reeling apparatus having a measuring and spooling mechanism embodying the features of the present invention.

FIG. 2 is a partial sectional view through the apparatus on the line 2—2, FIG. 1, and showing a side elevation of the measuring device.

FIG. 3 is a partial plan view of the measuring and spooling structure.

FIG. 4 is a partial sectional view through the measuring and spooling apparatus.

FIG. 5 is an enlarged partial sectional view through the screw and follower in the spooling apparatus.

FIG. 6 is a sectional view similar to FIG. 5, with the follower disengaged from the screw.

FIG. 7 is a partial side elevational view of a modified form showing a tension indicator on the measuring device.

Referring more in detail to the drawings:

The numeral 1 generally designates a reeling apparatus having a measure meter and level wind or spooling mechanism 2 operating on a line 3, for example a wire line, payed out or reeled in on a drum 4 whereby the line is spooled or provided with a level wind on the drum and the length of line moving through the measure meter is measured. In the structure illustrated, the drum 4 is rotatably mounted in bearing members 5 carried by a frame 6, and said drum is operatively connected to a clutch controlled driving member 7 for selectively rotating the drum. A suitable brake 8 is engageable with a portion of the drum to retain same stationary and to retard the rotation of the drum in response to a load or pull on the line 3, tending to unwind the line from the drum whereby the brake provides a control for the paying out of the line from the drum.

A shaft 9 is supported on the frame 6 in spaced relation to the drum 4 and parallel to the axis of rotation thereof. In the structure illustrated, the shaft 9 has ends mounted in standards 10 fixed to the frame spaced forwardly of the bearing members 5 or toward the direction in which the line is to be payed from the drum. The shaft 9 is held stationary in the standards 10 and has a double thread 11 extending for a length thereon whereby the guide structure of the measuring and spooling mechanism 2 will move to and fro for a length that substantially corresponds to the length of the drum on which the wire line 3 is wound.

A measure meter 12 serves as a guide for the level wind or spool mechanism 2 and includes a frame 13 with a driving wheel structure 14 rotatably carried thereby. The frame 13 is rotatable and movable on a support which, in the structure illustrated, is the shaft 9, and a follower or traveler 15 is operatively connected with the driving wheel 14 to effect movement longitudinally of the shaft 9 in response to rotation of the driving wheel 14. In the structure illustrated, the thread 11 has right and left cam grooves 16 and 17 respectively with interconnecting portions 18 whereby the follower or traveler 15, which is pivotally mounted as by a pin 19 thereof in a bearing member 20, is free to move from one groove to the other as the guide structure approaches the respective ends of the threaded portion of the shaft 9 so as to reverse the direction of travel of the line guide structure. The movement of the measuring and spooling mechanism which also serves as the guide structure is to and fro across the front of the reel at speeds in direct proportion to the rotational speed of the reel so the cable is wound and unwound in layers. The follower may be moved and disengaged from the threads of the shaft 9 as later described whereby the measuring mechanism will float free on said shaft 9.

In the structure illustrated, the driving wheel 14 has a hub 21 with a bore 22 through which the shaft 9 extends. A bearing bushing 23 is arranged in the hub and rotatably mounts the driving wheel on the threaded shaft with the hub 21 and bushing 23 therein having suitable length for adequate support on the crests 24 of the threads whereby there is a suitable running fit without excessive wear or looseness. The bearing member 20 is removably mounted in the hub 21, said bearing member preferably having screw threads 25 engaged in a threaded bore 26 which aligns with an aperture 27 in the bushing 23 whereby upon removal of the bearing member 20 the follower 15 can also be removed and repaired or replaced. The wheel 14 preferably has an annular web or flange 28 having a replaceable rim 28' suitably secured to the flange by fastening devices 29 such as screws. The rim 28' has a groove 30 in the periphery thereof, said groove being of suitable width to receive a wrap of the line 3 therein. The groove 30 of the wheel 14 is such that the surface 32 at the root of the groove is of a measured circumference and is a peripheral surface engaged by the line whereby one rotation of the wheel in response to movement of the line thereover provides a definite measure of the line, as for example, two feet, and the counting of the rotations of the wheel will provide an accurate indication of the line payed thereover.

The frame 13 has spaced members 33 and 34 which are in the form of collars or rings having bearing members 35 preferably of the anti-friction type such as ball bearings therein engaged with opposite end portions of the hub 21 whereby the flange 28 of the wheel is located therebetween. The members 33 and 34, together with the bearings 35 therein, are retained on the hub between shoulders 36 of the hub and retaining rings 37 mounted in grooves 38 to prevent relative endwise movement of the frame members and wheel. The wheel 14 also has a gear member 39 fixed thereon as by pins 40 adjacent the frame member 33 for driving a gear member 41 keyed to a shaft 42 as by a pin 43 of a counter 44 supported on a bracket 45 suitably secured to the frame member 33 as by fastening devices such as screws 46. The gears 39 and 41 are of a suitable ratio relative to the circumference of the surface 32 and are of a two-to-one ratio for a structure in which one rotation of the wheel pays out two feet of line whereby the counter is actuated to indicate the number of feet of line payed over the wheel 14 in response to each rotation thereof.

Arms 47 and 48 are fixed on the frame members 33 and 34 respectively and extend outwardly generally radially relative to the shaft 9 and toward the drum 4. The arms 47 and 48 are turned inwardly and terminate in substantially parallel free end portions 49 and have a pulley or guide roller 50 rotatably mounted therebetween on a suitable shaft which, in the illustrated structure, is in the form of a bolt 51. The pulley or guide roller 50 has a groove 52 adapted to receive the line 3, the groove being in line with and substantially coplanar with the groove 30 in the wheel 14. The guide roller 50 engages under the line 3, as illustrated in FIG. 2, and a guide roller or pulley 53 engages on top of the line between the roller 50 and the wheel 14. The roller 53 has a groove 54 also in the same plane as the groove 52 in the roller 50 and said roller 53 is rotatably mounted on a shaft such as a bolt 55 carried on free ends 56 of spaced arms 57 and 58 with the other ends of said arms rotatably mounted on the shaft of the bolt 51 preferably between the arm portions 49 and the roller 50, as illustrated in FIG. 3. The bolts 51 and 55 preferably have nuts 59 and 60 respectively to retain the arms thereon and to facilitate assembly and disassembly.

The arm 58 has an extension 61 extending over the wheel 14 with a brake member 62 suitably secured thereto and having a downwardly extending flange or shoe 63 adapted to extend into the groove 30 and engage the line 3 in the wheel groove. The brake member is preferably of fiber or other frictional material to provide a friction engagement with the line to hold same in place. The brake member and the arms carrying same are biased toward the wheel 14 and the arm 47 by a spring 64 having ends connected to the arm 47 and 57 respectively, as illustrated in FIG. 2. The arrangement of the guide rollers 50 and 53 is such that they engage the line 3 in opposed relation and tension on the line tends to swing the roller 53 away from the arm 47 and thereby lifts the brake member 62 from engagement with the line on the wheel 14 to release same for movement.

In the structure illustrated the follower 15 has a socket 65 in the pin 19 on a stem 66 is secured to said pin that extends through a bore 67 in the outer end of the bearing member 20 and exteriorly thereof has an end member 68 whereby the follower 15 and pin 19 may be moved longitudinally of said bearing member 20. The housing on hub 21 has a slot 69 to permit movement of the follower whereby it may be selectively disengaged from the screw 9 as illustrated in FIG. 6 whereby the spooling device will float or be freely movable longitudinally of said screw. A spring 70 is sleeved on the stem 66 with ends engaging the pin and bearing member to urge the follower toward the screw. A stop member 71 is mounted on the stem 66 and consists of a disk 72 with an elongated rod 73 alongside the stem and normally extends in a slot 74 in the end of the bearing member whereby the follower engages the screw as illustrated in FIG. 5. In order to disengage the follower from the screw the disk 72 is pulled out to move the end of the rod 73 from the slot 74 and then rotated to engage the end 75 of the rod with the surface 76 of the bearing member and hold the follower disengaged from the screws as shown in FIG. 6.

In operating a measuring and spooling apparatus such as illustrated and described, with a line 3 wound on a drum 4, the end of the line is pulled from the drum and extended over the pulley or guide roller 50 and engaged in the groove 52 thereof and then under the pulley or roller 53 and engaged in the groove 54 thereof, and then extended in a complete wrap around the wheel 14 in the groove 30 thereof. The line 3 extends from the wheel 14 in a direction opposite to the drum and is attached to a load to be lowered or otherwise arranged whereby it will apply a pull on the line, tending to draw same from the drum. With the apparatus so positioned, the groove of the wheel 14 is substantially in the plane of the portion of the line extending to the drum which plane is perpendicular to the axis of the drum and the follower 15 is engaged in the grooves of the thread 11 whereby on rotation of the wheel the measuring and spooling mechanism 2 will move on the screw thread of the shaft 9 to maintain the line between the drum and the wheel 14 in a plane perpendicular to the axis of the drum as the line is unwound therefrom. The brake 8 is then partially released whereby the load on the line 3 pulls the line from the drum and applies a tension to the line that tends to straighten same and apply a force to the roller 53 to swing the arms 57 and 58 away from the arms 47 and 48 extending the spring 64 and moving the brake member 62 away from the line on the wheel 14. Due to the bight of the line on the wheel 14, paying out of the line causes the wheel 14 to rotate on the shaft 9 and, due to the engagement of the follower 15 in the grooves of the thread 11, the mechanism 2 is caused to move longitudinally of the shaft 9. The rotation of the wheel 14 rotates the gear 39 to drive the gear 41 and the counter 44 whereby the counter indicates the feet of line payed out over the wheel 14. When the follower 15 reaches the end of the thread 11, the follower turns to cause the mechanism 2 to move in the opposite direction on the shaft 9 in accordance with the lay of the line on the drum 4. When the load reaches a position of rest whereby the tension on the line 3 is relaxed, the spring 64 swings the arms 57 and 58 downwardly to a position as illustrated in FIG. 2 wherein the brake member 62 engages the line on the wheel 14 to hold same in position and in engagement with the wheel in the groove 30 thereof. When it is desired to raise the load, the drum driving member 7 is actuated to rotate the drum to wind the line thereon and, during such winding operation, the engagement of the line with the wheel 14 rotates same to cause the measuring and spooling mechanism 2 to move to and fro on the shaft 9 in response to rotation of the wheel and serve as a guide, providing a level wind of the line on the drum 4.

In the form of the invention illustrated in FIG. 7, the arm 57 has a scale member 77 on the free end thereof provided with graduations 78 and a pointer 79 is mounted on the arm 47 whereby movement of the arm 57 in response to tension on the line 3 causes the scale 77 to move relative to the pointer 79 and the position of the pointer relative to the graduations 78 indicates the tension or force being applied to the line 3 tending to pull same from the drum. With this arrangement, there is a load indicator whereby an operator experienced with conditions that may be encountered can tell by the indications of variations in the load the different conditions being encountered in the lowering of the load on the line, as for example, in lowering a device into a well, the changes in tension will indicate when the load is moving through water or fluid of different specific gravity such as oil, or that the load may be dragging on the walls of the well, or that the load is passing through gas-containing strata and the like. The operator with such knowledge may then vary the rate of paying out of the line in accordance with the conditions in the well.

From the foregoing, it is obvious that I have provided a measure meter which will accurately record the length of line fed therethrough, that the measure meter will operate accurately in either direction, and that the line will be guided to provide a level wind on the drum and, also, that the line will be maintained in engagement with the wheel regardless of the tension on the line.

It is to be understood that while I have illustrated and described certain forms of my invention, it is not to be limited to the specific forms or arrangements of parts herein described and shown except insofar as such limitations are included in the claims.

What I claim and desire to secure by Letters Patent is:

1. In a well measuring apparatus,
   (a) a support,
   (b) a frame carried by said support,
   (c) a driving wheel rotatable in said frame and adapted to have a line in a bight therearound,
   (d) an arm fixed to said frame and extending therefrom,
   (e) a guide means on the free end of the arm and positioned in coplanar relationship with said driving wheel whereby said guide means engages a line to be payed out over said wheel,
   (f) a second arm pivotally mounted on said free end of the first-named arm and extending therefrom toward said wheel,
   (g) a second guide means mounted on said second arm and engaging said line between the first-named guide means and said wheel, said second guide means engaging the line in opposed relationship to the first-named means and said wheel, and
   (h) means biasing said second arm toward said wheel.

2. In a well measuring apparatus,
   (a) a support,
   (b) a frame rotatably carried by said support,
   (c) a driving wheel rotatable in said frame and adapted to have a line in a bight therearound,
   (d) an arm fixed to said frame and extending therefrom,
   (e) a guide roller rotatable on the free end of the arm and positioned in coplanar relationship with said driving wheel whereby said roller engages a a line to be payed out over said wheel,
   (f) a second arm pivotally mounted on said free end of the first-named arm and extending therefrom toward said wheel,
   (g) a second guide roller rotatably mounted on said second arm and engaging said line between the first-named guide roller and said wheel, said second guide roller engaging the line in opposed relationship to the first-named roller and said wheel,
   (h) means biasing said second arm toward said wheel, and
   (i) means driven by said wheel for indicating the length of line payed thereover.

3. In a well measuring apparatus,
   (a) a support,
   (b) a frame carried by said support,
   (c) a driving wheel rotatable in said frame and adapted to have a line in a bight therearound,
   (d) an arm fixed to said frame and extending therefrom,
   (e) a guide roller rotatable on the free end of the arm and positioned in coplanar relationship with said driving wheel whereby said roller engages a line to be payed out over said wheel,
   (f) a second arm pivotally mounted on said free end of the first-named arm and extending therefrom toward said wheel,
   (g) a second guide roller rotatably mounted on said second arm and engaging said line between the first-named guide roller and said wheel, said second guide roller engaging the line in opposed relationship to the first-named roller and said wheel,
   (h) means biasing said second arm toward said wheel, and
   (i) brake means on said second arm engageable with the line on said wheel to hold said line thereon and movable to disengaged relationship in response to tension on the line moving the second arm away from said wheel.

4. In a well measuring apparatus,
   (a) a support,
   (b) a frame rotatably carried by said support,
   (c) a driving wheel rotatable in said frame and adapted to have a line in a bight therearound,
   (d) an arm fixed to said frame and extending therefrom,
   (e) a guide means on the free end of the arm and positioned in coplanar relationship with said driving wheel whereby said guide means engages a line to be payed out over said wheel,
   (f) a second arm pivotally mounted on said free end of the first-named arm and extending therefrom toward said wheel,
   (g) a second guide means rotatably mounted on said second arm and engaging said line between the first-named guide means and said wheel, said second guide means engaging the line in opposed relationship to the first-named roller and said wheel,
   (h) means biasing said second arm toward said wheel,
   (i) brake means on said second arm engageable with the line on said wheel to hold said line thereon and movable to disengaged relationship in response to tension on the line moving the second arm away from said wheel, and
   (j) means driven by said wheel for indicating the length of line payed thereover.

5. In combination,
   (a) a drum carrying a wire line supported for rotation on a longitudinal axis for paying out said wire line,
   (b) an elongate shaft supported in spaced parallel relation to said drum axis,
   (c) a grooved wheel having a hub rotatable on said shaft and movable longitudinally thereof, said wire line extending around said grooved wheel,
   (d) a frame rotatable on said wheel hub and having an arm extending outwardly toward said drum,
   (e) a grooved guide roller rotatable on said arm and spaced from said wheel and adapted to engage said line between the drum and said wheel,
   (f) means associated with said wheel for moving same to and fro on the shaft in response to rotation of said wheel,
   (g) means driven from said grooved wheel to indicate the length of wire payed out over said wheel, and
   (h) means operatively connected with said drum to control rotation thereof.

6. The combination as set forth in claim 5 wherein said grooved wheel is said hub with an annular web and a rim removably mounted on said web with the groove extending circumferentially of said rim.

7. In combination,
   (a) a drum carrying a wire line supported for rotation on a longitudinal axis for paying out said wire line,
   (b) an elongate shaft supported in spaced parallel relation to said drum axis,
   (c) a grooved wheel having a hub rotatable on said shaft and movable longitudinally thereof, said wire line extending around said grooved wheel,
   (d) a frame rotatable on said wheel hub and having an arm extending outwardly toward said drum,
   (e) a grooved guide roller rotatable on said arm and spaced from said wheel and adapted to engage said line between the drum and said wheel, (f) a second arm having one end pivoted on said first-named arm and extending toward said wheel,
(g) a second grooved guide roller on said second arm engaging said wire line between the first-named grooved guide roller and said wheel and in opposed relation thereto,
(h) means biasing said second arm toward the first-named arm and wheel,
(i) an extension on said second-named arm adapted to engage the wire line in the groove of the wheel to hold the line therein when tension is relaxed on said line, said extension moving with said second arm to release the engagement of the extension with the wire line in response to tension on said line,
(j) means driven from said grooved wheel to indicate the length of wire payed out over said wheel, and
(k) means operatively connected with said drum to control rotation thereof.

8. In combination,
(a) a drum carrying a wire line supported for rotation on a longitudinal axis for paying out said wire line,
(b) a level wind screw supported in spaced parallel relation to said drum axis,
(c) a grooved wheel having a hub rotatable on said screw and movable longitudinally thereof, said wire line extending around said grooved wheel,
(d) a frame rotatable on said wheel hub and having an arm extending outwardly toward said drum,
(e) a guide means on said arm and spaced from said wheel and adapted to engage said line between the drum and said wheel,
(f) a second arm having one end pivoted on said first-named arm and extending toward said wheel,
(g) a second guide means on said second arm engaging said wire line between the first-named guide means and said wheel and in opposed relation thereto,
(h) means biasing said second arm toward the first-named arm and wheel,
(i) means driven from said grooved wheel to indicate the length of wire payed out over said wheel, and
(j) means associated with said wheel and engaged with said level wind screw for effecting movement of said frame longitudinally of said level wind screw in response to rotation of said wheel to guide the line in effecting level winding thereof on said drum.

9. In combination,
(a) a drum carrying a wire line supported for rotation on a longitudinal axis for paying out said wire line,
(b) a level wind screw supported in spaced parallel relation to said drum axis,
(c) a grooved wheel having a hub rotatable on said screw and movable longitudinally thereof, said wire line extending around said grooved wheel,
(d) a frame rotatable on said wheel hub and having an arm extending outwardly toward said drum,
(e) a grooved guide roller rotatable on said arm and spaced from said wheel and adapted to engage said line between the drum and said wheel,
(f) a second arm having one end pivoted on said first-named arm and extending toward said wheel,
(g) a second grooved guide roller on said second arm engaging said wire line between the first-named grooved guide roller and said wheel and in opposed relation thereto,
(h) means biasing said second arm toward the first-named arm and wheel,
(i) an extension on said second-named arm adapted to engage the wire line in the groove of the wheel to hold the line therein when tension is relaxed on said line, said extension moving with said second arm to release the engagement of the extension with the wire line in response to tension on said line,
(j) means driven from said grooved wheel to indicate the length of wire payed out over said wheel,
(k) means operatively connected with said drum to control rotation thereof, and
(l) means associated with said wheel and engaged with said level wind screw for effecting movement of said frame longitudinally of said level wind screw in response to rotation of said wheel to guide the line in effecting level winding thereof on said drum.

References Cited in the file of this patent
UNITED STATES PATENTS

| | | |
|---|---|---|
| 2,021,632 | Mathey et al. | Nov. 19, 1935 |
| 2,271,742 | McCullough | Feb. 3, 1942 |
| 2,445,212 | Eaby | July 13, 1948 |
| 2,882,490 | Sheets | Apr. 14, 1959 |